Patented Feb. 24, 1942

2,273,923

UNITED STATES PATENT OFFICE 2,273,923

SEPARATION OF ORGANIC COMPOUNDS

Joseph E. Bludworth, Cumberland, Md., assignor to Celanese Corporation of America, a corporation of Delaware No Drawing. Application March 11, 1939, Serial No. 261,236

6 Claims. (Cl. 202—42)

This invention relates to the separation and recovery of components of a binary mixture composed of acetone and cyclic ethers.

An object of the invention is the economic and expeditious recovery of the individual components of a binary azeotropic mixture containing acetone and a cyclic ether.

A constant boiling ternary mixture comprising methyl alcohol, acetone and tetramethylene oxide or other cyclic ethers is formed in the recovery of oxygenated products produced by the partial oxidation of hydrocarbons, such for example as are described in my U. S. Patents Nos. 2,128,908 and 2,128,909 both of September 6, 1938. As is described in my U. S. Patent No. 2,198,651 of April 30, 1940, this ternary mixture can be separated into component parts, by distilling the same while causing a stream of water to pass countercurrent to the ascending vapors, whereby the methyl alcohol and water are recovered in liquid form as a binary mixture and the acetone and tetramethylene oxide or other cyclic ether pass off in vapor form to be condensed as an azeotropic liquid.

I have found that the constant boiling mixture of cyclic ether and acetone may be readily separated by subjecting the same to distillation in the presence of a relatively high-boiling organic compound in which the cyclic ether is reasonably soluble. In this manner the acetone passes off in vapor form to be condensed, while the cyclic ether and the relatively high boiling organic compound are separated as a liquid mixture which can be readily separated into its component by simple distillation.

While this invention is applicable to mixtures containing acetone and a cyclic ether having a higher boiling point than acetone, such as isobutylene oxide, it will be more particularly described in connection with the treatment of a mixture of acetone and tetramethylene oxide.

Any suitable organic liquid miscible with the tetramethylene oxide and having a relatively high boiling point may be used to cause the separation of the acetone from the cyclic ether, say one having a boiling point of 50° C. or more than that of the cyclic ether. Examples of suitable materials are polyhydric alcohols such as ethylene glycol, diethylene glycol, 2,3-butylene glycol, or glycerol, and partial ethers of such polyhydric alcohols, such as the monomethyl- or monoethyl-ether of ethylene glycol.

The high boiling liquid used may be added to the mixture to be separated in any suitable manner, such as by its addition prior to distillation. However, for economy and effectiveness, I prefer to pass the vaporous mixture of acetone and tetramethylene oxide into a fractionating column near the top of which the cool high boiling liquid is added. From this column the acetone passes out as a vapor and is condensed in pure form. The tetramethylene oxide condenses and passes out through the base of the column in admixture with the high boiling mixture. The tetramethylene oxide may be separated from the high boiling mixture by ordinary fractional distillation methods.

In order further to illustrate my invention, but without being limited thereto, the following specific example is given.

Example

A constant boiling mixture consisting of 9 parts by weight of acetone and 1 part by weight of tetramethylene oxide is introduced while at its boiling temperature of 55° C. into the base of a fractionating column provided with a reflux having bubble cap baffle plates, Raschig rings or other usual devices for causing contact of vapor and liquid. Near the top of the column, there is introduced therein ethylene glycol in liquid form at room temperature in amount of 20 to 200% of the weight of the vaporous mixture of acetone and tetramethylene oxide. The acetone vapors leaving the top of the column are condensed whereby pure acetone is obtained. From the bottom of the column, a mixture of glycol and tetramethylene oxide is recovered, which is then passed to a distilling column. The tetramethylene oxide which recovered as vapor from the column is condensed, while the glycol is recovered from the still as liquid.

It is to be understood that the foregoing detailed description is given merely by way of illustration and that many variations may be made therein without departing from the spirit of my invention.

Having described my invention, what I desire to secure by Letters Patent is:

1. Method of separating a constant boiling mixture of acetone and a cyclic ether, the ether having a higher boiling point than the acetone into its components, comprising contacting the vapors of the mixture in a distillation unit with an organic liquid miscible with and having a higher boiling point than the cyclic ether selected from the group consisting of polyhydric alcohols and their partial ethers under such conditions that the acetone remains in vapor form while the cyclic ether condenses.

2. Method of separating a mixture of acetone and tetramethylene oxide into its components, comprising contacting said mixture while in vapor form in a distillation unit with an organic liquid miscible with and having a higher boiling point than the tetramethylene oxide selected from the group consisting of polyhydric alcohols and their partial ethers at such a temperature that the acetone remains in vapor form while the tetramethylene oxide condenses.

3. Method of separating a mixture of acetone and tetramethylene oxide into its components, comprising contacting said mixture while in vapor form in a distillation unit with liquid ethylene glycol at such a temperature that the acetone remains in vapor form while the tetramethylene oxide condenses.

4. Method of separating a mixture of acetone and tetramethylene oxide into its components, comprising contacting said mixture while in vapor form in a distillation unit with liquid butylene glycol at such a temperature that the acetone remains in vapor form while the tetramethylene oxide condenses.

5. Method of separating a mixture of acetone and tetramethylene oxide into its components, comprising contacting said mixture while in vapor form in a distillation unit with liquid glycerol at such a temperature that the acetone remains in vapor form while the tetramethylene oxide condenses.

6. Method of separating a constant boiling mixture of acetone and a cyclic ether, the ether having a higher boiling point than the acetone, into its components, which comprises distilling the mixture in the presence of an organic liquid miscible with and having a higher boiling point than the cyclic ether selected from the group consisting of polyhydroxy alcohols and their partial ethers, whereby the acetone vapor only is passed over and condensed.

JOSEPH E. BLUDWORTH.